Feb. 28, 1928.

R. W. E. MILLIKEN

TRUCK

Filed June 26, 1926

Inventor:
Ralph W. E. Milliken
by Emery, Booth, Janney & Varney
Attys.

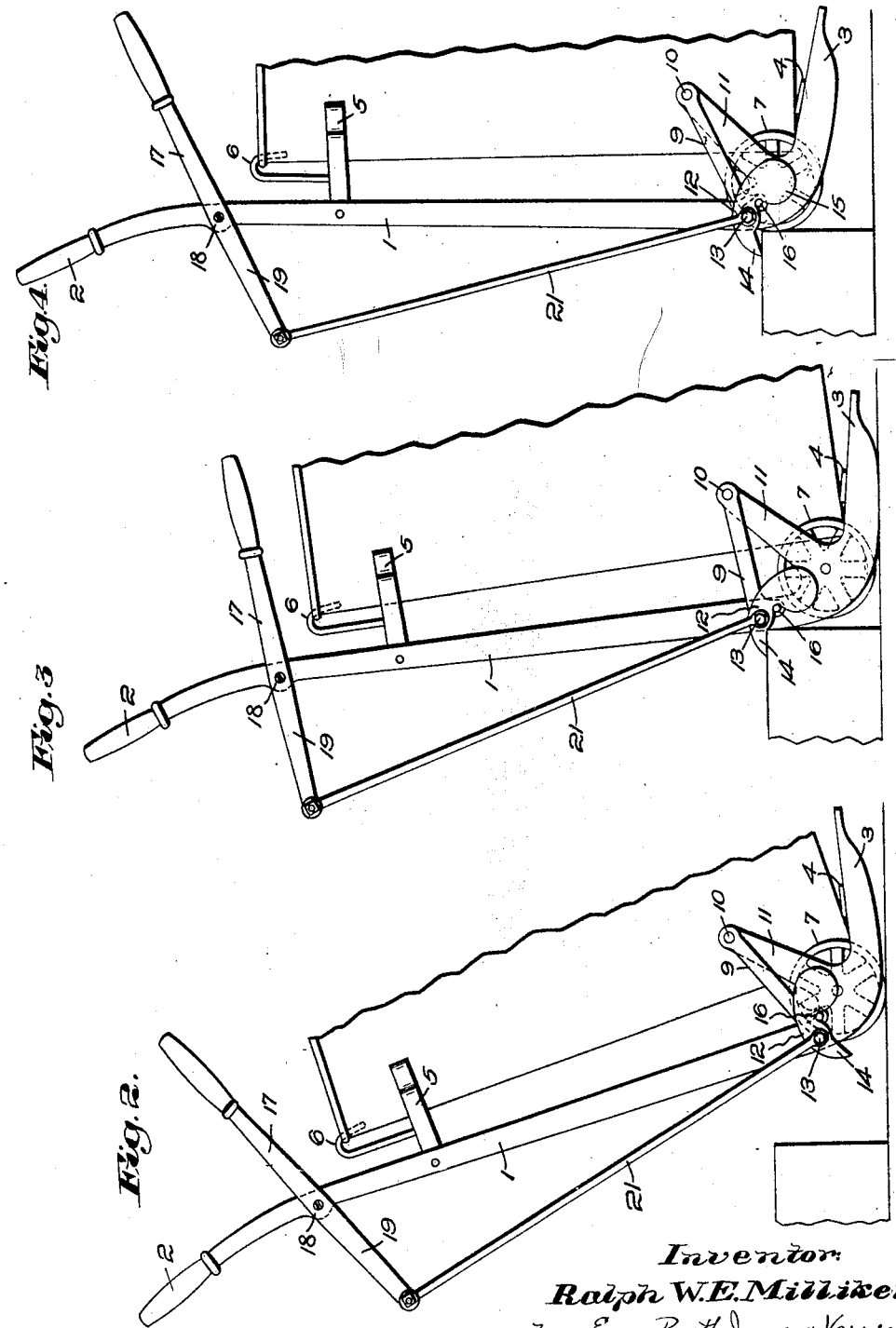

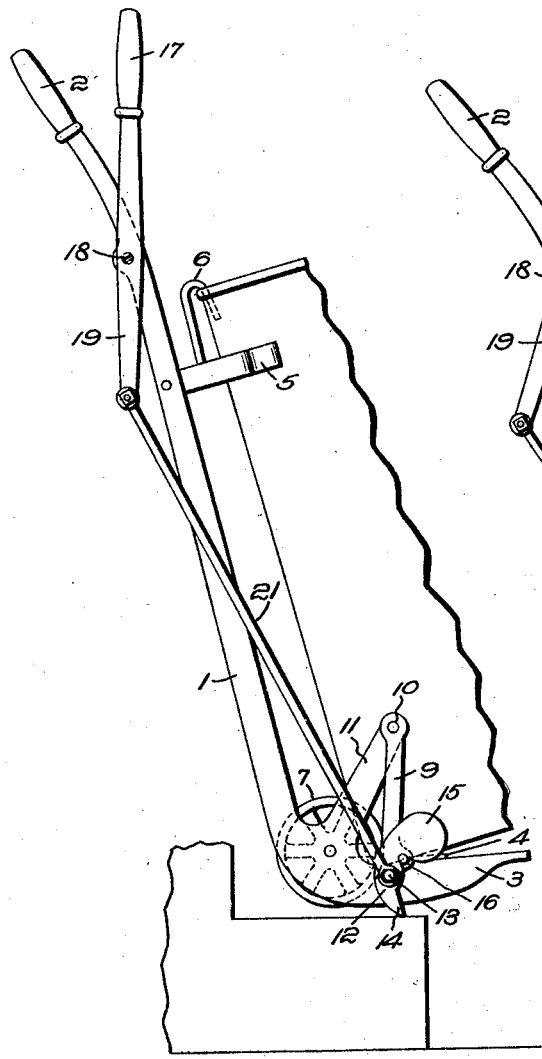
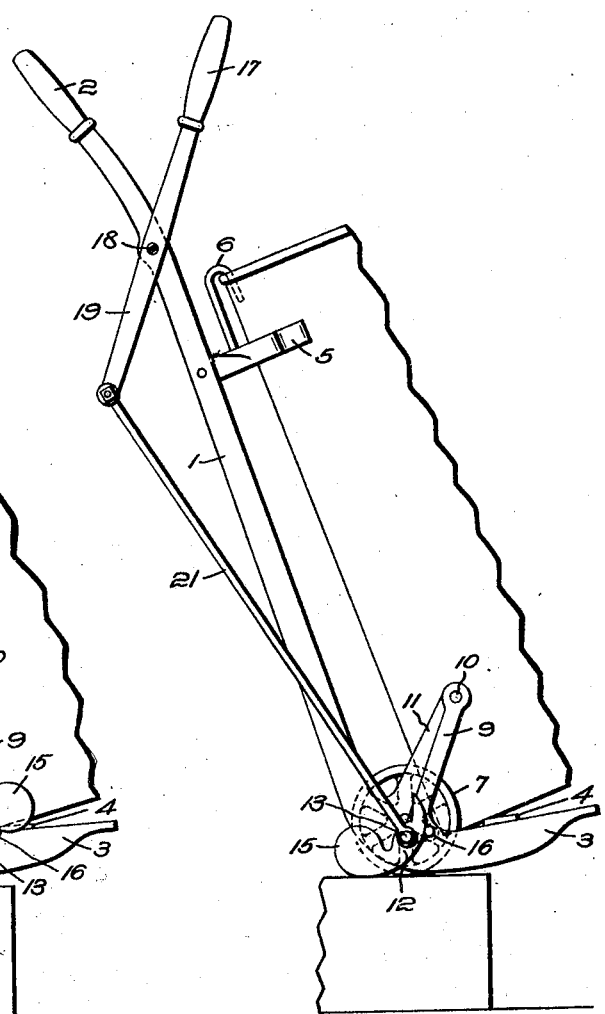

Patented Feb. 28, 1928.

1,660,517

UNITED STATES PATENT OFFICE.

RALPH W. E. MILLIKEN, OF LEXINGTON, MASSACHUSETTS.

TRUCK.

Application filed June 26, 1926. Serial No. 118,757.

My invention relates to trucks, and more particularly aims to provide an improved lifting truck whereby a load, such as an ash can, barrel or the like may readily be moved from one level to another, as in ascending or descending a flight of steps.

In the drawings illustrating by way of example one embodiment of my invention:—

Fig. 2 is a side elevation of the truck of Fig. 1, but loaded, and with the several parts in their usual position for trucking, the truck being illustrated as approaching a step or the like onto which it is to be lifted;

Figs. 3, 4, 5 and 6 are views similar to Fig. 2, but illustrating successive positions assumed by the truck and lifting mechanism in moving from one to a higher level.

Figure 1:
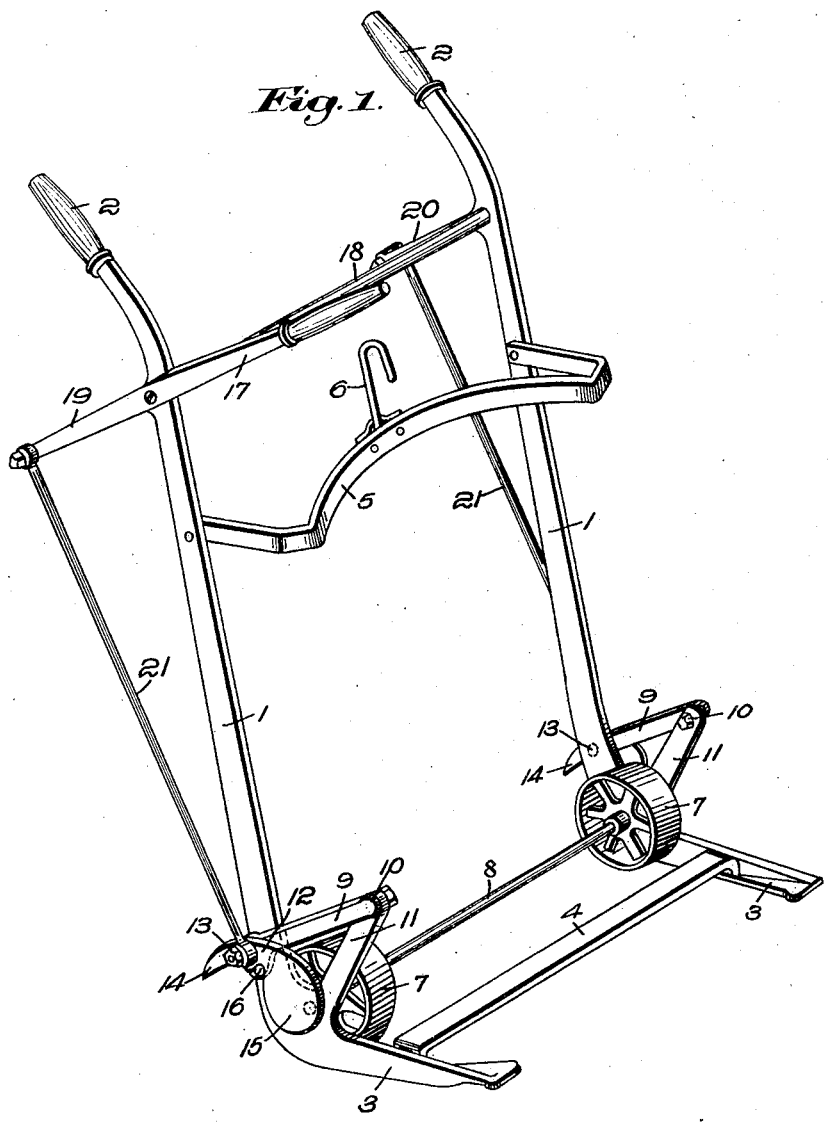
Fig. 1 is a perspective view of a truck in accordance with one form of the invention.

Referring first more particularly to Fig. 1 the truck there shown as illustrative of my invention comprises a suitable frame including the side members 1, 1 having at one end the grips 2, 2 constituting the handle portion of the frame, and at their opposite ends provided with the forward extensions or feet 3, 3. Said side members are rigidly held in the desired spaced relation as by the cross bar 4 extending between said feet and adapted to receive and support the load, and by the cradle 5 secured at its opposite ends, adjustably if desired, to said side members. Said cradle may be of any suitable shape to receive the adjacent portion of a load; as illustrated it has a bowed portion particularly adapting the truck for use with barrels, ash cans, or the like. A movable latch 6 may be provided on the cradle, adapted to hook over the edge of the barrel or can to retain the latter in loaded position.

At the lower portion of the frame are journalled suitable wheels 7, 7, herein carried by a common axle 8 extending between the side members. Said cross bar 4 and cradle 5 constitute the direct load-supporting portion of the truck. Desirably the feet 3, 3 have substantially the wedge-like formation as illustrated, permitting them to be forced under the load to assist in positioning the latter on the truck.

Near the lower end of the frame, herein at each side thereof, is movably secured an arm 9, herein pivoted at 10, 10 respectively to brackets 11, 11 integral with the frame side members 1, 1. Each of said arms 9, 9 carries a lifting member or dog 12, each pivoted to its arm at 13 respectively. Said dogs each have a nose 14 adapted to engage an elevation such as a step or other surface at a level above that on which the truck rests, as shown in Fig. 3. At their opposite ends said dogs are provided with a weighted portion 15, and at a position between their point of pivotal attachment to their arm 9 are recessed for engagement with a stop 16, one on each arm.

From the foregoing it will be apparent that when a dog is in engagement with a surface to which the truck is to be lifted, as shown for example in Fig. 3, the stop 16 will prevent relative movement between the dog and its supporting arm in one direction, so that said parts will move as a rigid unit when under a load.

Suitable means is provided whereby an operator standing at the rear of the truck in the normal position to grasp its handle portion may operate the lifting mechanism, including the arms and dogs, to raise the truck with its load. As herein illustrated, said means includes an operating lever 17 pivotally supported upon the frame and normally extending forward therefrom in substantially the position of Fig. 1. As I have in the present instance provided a step-engaging dog and associated mechanism at each side of the truck the operating lever 17 is connected with both of said mechanisms so that they may be moved simultaneously. It will be understood, however, that in some instances a single lifting element or dog and cooperating parts might be employed at a point between the sides of the frame, although I have found the use of a plurality of lifting elements preferable.

Accordingly the operating lever 17 is fixedly secured to a cross rod 18 rotatively supported in the frame side members near their handle portion. Fast at the opposite ends of said rod are the fingers 19, 20, one of which, herein the finger 19, may be formed integrally with the operating lever 17. Said fingers are operatively connected with the respective dogs by means of the links 21, 21, each pivotally connected at one end with one of said fingers and at its other end with a dog at the point of pivotal support of the latter upon its arm.

Through the described operating connections it will be seen that downward movement of the operating lever will raise the pair of arms 9, 9, together with their dogs, while upward movement of said lever will effect a reverse movement of the arms and dogs. When the latter are restrained from movement by engagement with an elevation such as a step, as in Fig. 3, the necessary result will be to lift the truck with its load about the dogs as a fulcrum.

Successive stages in the operation of the mechanism in moving from one to a higher level are clearly illustrated in Figs. 2 to 6. Having placed the ash can or other object to be transported upon the truck, where it may be held by the latch 6, the operator may tilt the truck rearwardly sufficiently to remove the feet from contact with the ground, permitting handling of the truck in the usual manner. At such time the position of the parts is substantially that shown in Fig. 2, in which the loaded truck is shown approaching a step.

In Fig. 3 the operating lever 17 has been depressed, raising the arms 9, 9 and dogs into position to engage the step, as there shown. The truck is also preferably tilted forward slightly so that it rests upon the feet 3, 3, and is now ready to be lifted on to the step, to effect which the operator pulls upwardly upon the lever 17, bringing the parts into the position illustrated in Fig. 4.

Since the pivots 18 of the operating lever and the pivots 10, 10 of the arms 9, 9 are fixed relatively to each other, both being on the truck frame, and since also the dogs are prevented by their stops 16, 16 from moving downwardly at their forward or weighted ends, it is obvious that such upward movement of the operating lever must result in a bodily lifting of the entire truck and contents. The proportion and arrangement of the parts is such as to afford a powerful leverage necessitating the application of but a relatively slight force to the operating lever.

Continued upward movement of the operating lever will bring the truck and lifting mechanism into the position shown in Fig. 5, wherein the truck has been lifted to the full extent required and is temporarily supported solely by the dogs. It will be noted that the arms 9, 9 have been swung upwardly about the noses of the dogs as a fulcrum, moving from a substantially horizontal position as in Fig. 3 to their approximately vertical position of Fig. 5. It will also be observed that said arms move in substantial parallelism with the operating lever 17, and as though the latter were an integral extension of the arms. Additional mechanical advantage is gained by means of the operating lever, however, both because of its greater length in comparison with the length of the fingers 19, 20 and also because said fingers and the links 21, 21 connecting them with the dogs function in the manner of a toggle.

Since said connecting links 21, 21 cannot move downwardly, being directly connected to the dogs which in turn engage the step, the necessary result is that the point of connection of the fingers with the frame must move up. This toggle-like action of the fingers and connecting links, together with the direct leverage supplied by the arms 9, 9 and their dogs readily effects the lifting of the truck with but little exertion upon the part of the operator.

Having reached the position illustrated in Fig. 5, a slight further upward movement of the operating lever or a slight rearward tipping of the truck will cause the dogs to rock or tilt downwardly and rearwardly, away from the stops 16, thereby letting down the truck onto the surface to which it has now been lifted. The resultant position of the parts is substantially that illustrated in Fig. 6.

Subsequent downward movement of the operating lever will bring the lifting mechanism again into the position shown in Fig. 2 in readiness to carry the truck up onto a succeeding level. Due largely to the provision of the pivoted dogs the truck may be used even on steps having the narrowest treads since the dogs, when raised in preparation for engagement with a succeeding step, may yield and tilt downwardly if their noses strike the edge of said higher step. The arms carrying the dogs can thus readily be raised to the height required, the weighted portion of the dogs causing the latter to drop back again into operating position as soon as their noses have cleared the step edge. When no further lifting is required the truck is immediately in position for transporting the load, without interference from the lifting mechanism or other part.

My invention is not limited to the particular illustrative embodiment shown and described herein, its scope being set forth in the following claims:

1. A truck having a frame provided with a handle portion, a lever element pivoted on the truck frame and having an elevation-engaging member, and means whereby an operator at the rear of the truck in position to grasp said handle portion may operate said lever element to raise the truck about said elevation-engaging member, the latter comprising a dog pivoted on said lever element, and stop means on said lever element and engageable with said dog to cause the latter and said lever element to move as a unit while sustaining the load, said dog adapted to tilt to let down the truck when raised to the desired level.

2. A load-lifting truck comprising a frame adapted to support the load, an arm movably connected to said frame, a dog pivoted on said arm and adapted to engage a surface above that upon which the truck rests, an operating member secured to the truck frame and connected with said dog, and means preventing relative movement between said dog and arm in one direction and thereby enabling the truck and load to be lifted about the surface engaging portion of said dog as a fulcrum, said dog being adapted to rock to let down the truck when lifted to the desired extent.

3. A load-lifting truck comprising a frame adapted to support the load, an arm movably connected to said frame, a dog pivoted on said arm and adapted to engage a surface above that upon which the truck rests, an operating member secured to the truck frame and connected with said dog, and means preventing relative movement between said dog and arm in one direction and thereby enabling the truck and load to be lifted by said operating member about the surface engaging portion of said dog.

4. In a load-lifting truck having a frame provided with a handle portion, a lever element pivoted on the truck frame and having an elevation-engaging member, and means whereby an operator at the rear of the truck in position to grasp said handle portion may operate said lever element to raise the truck about said elevation-engaging member, the latter being restrained from moving in one direction relatively to said lever element but being movable relatively thereto in the opposite direction to facilitate its engagement with successive elevations or to assist in letting down the truck.

5. A hand truck for moving barrels and the like, comprising a frame adapted to support the load, said frame including a pair of cross-connected side members, and an upwardly and forwardly projecting bracket 11 near the base of each side member, a pair of arms 9, 9 respectively movably connected to said brackets near their outer ends, a lifting member 12 on each arm adapted to engage an elevation, a cross rod 18 rotatively supported on the frame at a point remote from the points of connection of said arms 9, 9 with said brackets, an operating member 17 secured to said cross rod, spaced fingers 19 and 20 also secured to said cross rod, and pivoted links 21, 21 each connecting one of said fingers and the corresponding lifting member 12.

6. A truck comprising in combination a frame having a handle portion and a load-supporting portion, a pair of arms pivoted on the frame, one at each side thereof, a rockable dog near the free end of each arm and having a nose engageable with an elevation to which the truck is to be lifted, a shaft on the frame adjacent the handle portion, fingers fixed on said shaft, a connecting link between each finger and the respective dog, a stop on each arm engageable with its dog to prevent movement of the latter in one direction, and operating means for turning said shaft.

7. A load-lifting truck comprising in combination a frame, an element 9 movably connected to the frame, as at 10, a lifting member 12 on said element and adapted to engage an elevation, an operating member 17 movably supported on the frame near the upper portion thereof and having a part to be engaged by the operator to actuate it, and connections 19, 21 between said operating member and said lifting member, whereby movement of said operating member will raise the truck about said lifting member, the latter being restrained from moving in one direction relatively to its supporting element but movable relatively thereto in the opposite direction.

8. A truck comprising in combination a frame having a handle portion and a load-supporting portion, an arm pivoted upon the lower portion of the frame, a dog pivoted near the free end of said arm and having a nose engageable with an elevation to which the truck is to be lifted, an operating lever pivotally connected to the frame adjacent the handle portion, a connecting link between said lever and dog, and a stop on said arm engageable with said dog to prevent movement of the latter in one direction, whereby movement of said operating lever will cause the truck to be lifted about the nose of the dog, said operating lever and said pivoted arm then moving in substantial parallelism.

9. A truck comprising in combination a wheeled frame having a handle portion and a load-supporting portion, an arm pivoted on the frame adjacent the wheel axis, a rockable dog near the free end of said arm and having a nose engageable with a step or other surface to which the truck is to be lifted, an operating lever pivotally connected to the frame adjacent the handle portion, a connecting link between said lever and dog, and a stop on said arm engageable with said dog to prevent movement of the latter in one direction, whereby movement of said operating lever will cause the truck to be lifted about the nose of the dog as a fulcrum, said dog being constructed and arranged to rock away from said stop, in the direction opposite to that in which it was restrained, thereby to let down the truck onto the step or other surface when the truck has been lifted the necessary distance.

10. A load-lifting truck comprising, in combination, a frame, a lifter-carrying element movably engaged with the frame at the lower portion thereof, a lifter pivotally mounted on said element and adapted to engage an elevation, an operating member pivotally supported on the frame at the upper portion thereof and having a part to be engaged by the operator to actuate it, and a link pivotally connected at its opposite ends with said operating member and with said lifter respectively, whereby movement of said operating member will raise the truck about said lifter, the truck frame and said lifter-carrying element moving relatively to each other during said raising of the truck and during subsequent repositioning of the lifter for further actuation.

In testimony whereof, I have signed my name to this specification.

RALPH W. E. MILLIKEN.